Sept. 12, 1944.   D. R. TATE   2,357,856
HARDNESS TESTING APPARATUS
Filed Oct. 29, 1943   2 Sheets-Sheet 1
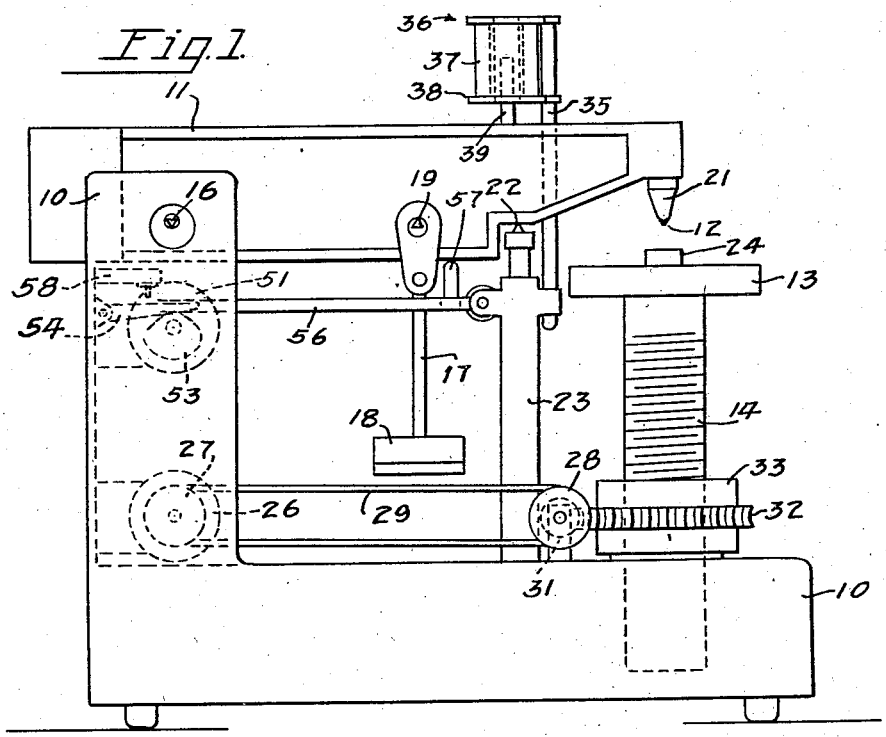
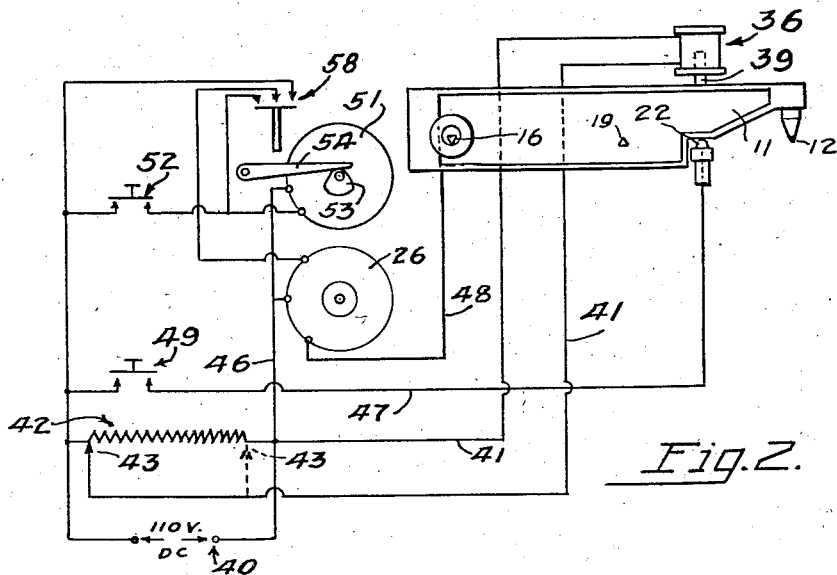
INVENTOR
DOUGLAS R. TATE
BY
ATTORNEY

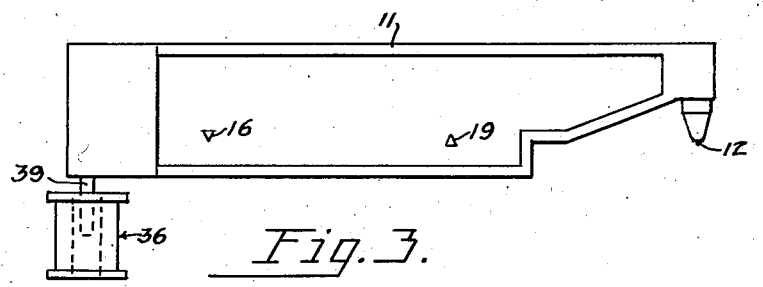
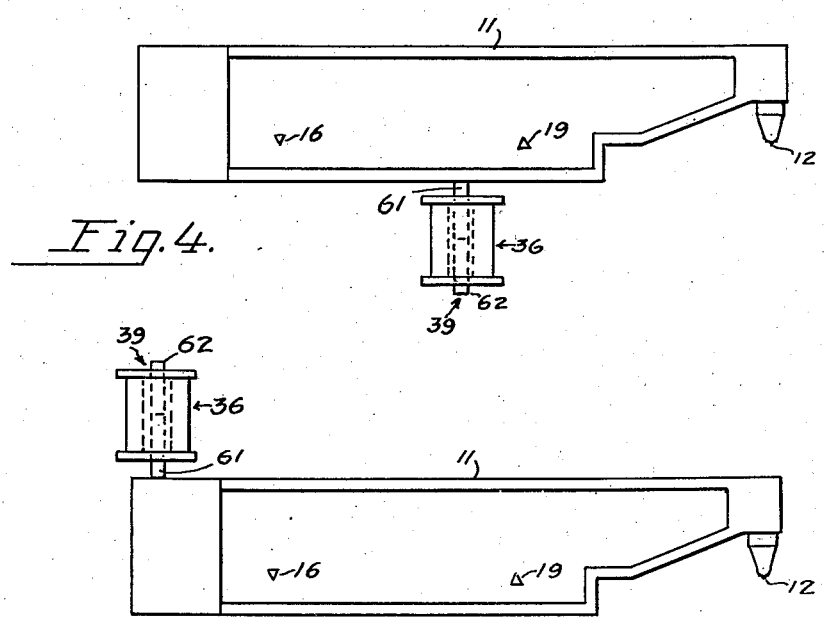

Patented Sept. 12, 1944

2,357,856

UNITED STATES PATENT OFFICE 2,357,856

HARDNESS TESTING APPARATUS

Douglas R. Tate, Arlington, Va., assignor to the Government of the United States, as represented by the Secretary of the Department of Commerce Application October 29, 1943, Serial No. 508,110

5 Claims. (Cl. 265—12)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to hardness testing apparatus or machines, and more particularly to improvements therein for eliminating errors incident to their operation.

It is customary to determine the hardness of various materials, and particularly metals with an indenting machine. In testing the hardness of a material with an indenting machine, an indenter is forced into the surface of a specimen or test piece under a known load. The hardness number for the material, of which the specimen is an example, is computed by dividing the indenting load by some quantity proportional to the area of the indentation.

In theory, at least, when the indenter is brought into contact with the surface of the specimen and the indenting force or load applied, the indenter sinks into the specimen, compressing and forcing the displaced material aside. For the usual shapes of indenters, the farther the indenter goes into the specimen, the larger the resultant indentation becomes and consequently the greater the area of the contact between specimen and indenter becomes.

Now the ability of the indenter to push its way into the specimen depends in part upon the stress set up between the indenter and the specimen. Since the stress is equal to the force per unit of area, the stress becomes less and less as the area of contact between indenter and specimen increases. Consequently, there will come a point where the stress has fallen to a value where the plastic flow of the specimen material ceases and the indenter remains in static equilibrium. If the indenter is now removed, the permanent indentation can be measured and its area calculated. Knowing the value of the indenting load, the hardness number can be computed.

The indenters used in hardness tests are usually spherical, conical or pyramidal in shape. One well known indenter is the Knoop indenter. The Knoop indenter is a diamond pyramid, a section of which taken parallel to the surface of the specimen is a rhombus having diagonals in the approximate relation of 7 to 1. A description of the Knoop indenter is given in the National Bureau of Standards Research Paper 1220, "A Sensitive Pyramidal-Diamond Tool for Indentation Measurements," This Knoop indenter is covered in U. S. Patent 2,091,995 which issued to Frederick Knoop on September 7, 1937.

A conventional and well known indenting or hardness testing machine comprises a base, a pivotally mounted and weighted beam or lever carrying an indenter, a rest for the lever, and power actuated screw means for elevating a work support to bring a test piece thereon into engagement with the indenter and to indent the test piece by having the latter raised and support the indenter and thereby the weighted lever.

An error due to inertia of the beam of this conventional machine has been noted and measured. During a test, the specimen was raised by the elevating screw at a speed of about 13 millimeters per minute. After the tip of the indenter had contacted the surface of the specimen, the indenter sank into the specimen until the indentation was so large that it would support the loaded indenter and the force on the indenter was equal to the desired value of the indenting load. Up to this instant, there had been no motion of the beam; but immediately thereafter the end of the beam carrying the indenter was accelerated up to the speed of the elevating screw, 13 millimeters per minute, since the motor driving the screw was not stopped until after the beam had moved upward a few thousandths of an inch. Measurements indicate that this change in speed took place in less than one ten-thousandth of a second. The effect of this acceleration was to produce a load on the indenter which was greater than the desired indenting load for which the machine was calibrated. Although this excess load disappears as soon as the beam has reached a uniform speed, experience shows that for very hard materials and low indenting loads a somewhat larger indentation results than would be produced by the desired value of the indenting load.

The errors due to inertia of a loaded beam are significant mainly in tests made with very low loads, 200 or 300 grams or less. That they are usually negligible in tests made with higher loads is explainable on the hypothesis that the time required for the material of the specimen to flow under the indenter is so large that as the specimen rises and contacts the indenter, the force rises to a value sufficient to start the beam upward before the indentation has reached its proper full size. The excess inertia load disappears before the material has completely flowed out under the load selected for the test, so that the inertia load has no effect on the final inden- It is therefore an object of this invention to so improve indenting or hardness testing apparatus as to eliminate errors due to inertia of its weighted beam or indenting lever.

Another object is to so improve indenting apparatus as to secure a smoother and more gradual application of the final part of the indenting load.

A further object is to provide indenting apparatus having an accurate predetermined maximum indenting load.

A still further object is to extend the useful range of indenting apparatus to loads less than 100 grams.

Still another object is to eliminate errors in indenting apparatus which have been due to vibrations set up by driving and operating mechanisms during the period when the indenting load is applied.

A further object is to provide indenting apparatus which minimizes the possibility of breakage of the indenter tips in the testing of extremely hard materials, such as carbides, precious gems, etc.

Still another object is to provide indenting apparatus with means for eliminating errors due to deformation of the edges of the indentation during removal of the indenter from the test piece.

Other objects and advantages of the invention will be apparent from the following description, the appended claims and the accompanying drawings, wherein Fig. 1 is an elevational view of indenting apparatus embodying the present invention.

Fig. 2 is a wiring diagram for the apparatus of Fig. 1.

Figs. 3, 4 and 5 show three different modifications in elevation for the relation of the weighted lever, the solenoid, and the magnetic core of Figs. 1 and 2.

Referring now to Figs. 1 and 2, the illustrated hardness tester or indenting apparatus comprises a base 10, a weighted lever or beam 11, an indenter 12, and a work support 13 mounted on an elevating screw 14.

The lever 11 at its opposite sides is pivotally connected to the base 10 by means of knife edges 16. The lever 11 is provided with a predetermined load by a weight hanger 17 having removable weights 18. The hanger 17 is pivotally supported from opposite sides of the lever 11 by means of knife edges 19. The indenter 12 is carried by a holder 21 which is rigidly connected to the outer end of the lever 11.

It is evident that the maximum indenting load on the indenter 12 is dependent on the weight of the lever 11, the relative positioning and arrangement of the knife edges 16 and 19 and the indenter 12, and the weight carried by the knife edges 19. A fine adjustment of the maximum load is obtained by choice of the weights 18 to be carried by the weight hanger 17.

An electrical contact 22 serves as a rest and support for the weighted lever 11. This contact is carried by and insulated from a standard 23 which is mounted on the base 10.

Prior to a hardness testing operation, the apparatus is set as illustrated in Fig. 1 and a specimen or test piece 24 is placed on the top of the work support 13. The specimen 24 is raised into engagement with the indenter 12 by elevating the screw 14 by means of conventional power actuating means or mechanism. The screw 14 may be driven by a reversible electric motor 26. The drive from the motor 26 may be transmitted, for example, by pulleys 27, 28, a belt 29, and gearing 31, 32. The gear 32 is carried on the periphery of a nut 33 into which the screw 14 is threaded. Rotation of the screw 14 is preferably avoided by providing a conventional spline connection (not shown) between the screw 14 and the base 10.

The motor 26 may be operated to elevate the screw 14 and the work support 13 to establish contact between the surface of the specimen 24 and the indenter 12. At the instant of contact, the effective load for the indenting operation is less than the maximum predetermined indenting load. This reduction in load in the early stage of the indenting operation is accomplished electromagnetically, as will now be explained.

A solenoid 36 is mounted on a rod 35 which is supported by the standard 23. This solenoid 36 may be an air core coil of copper wire 37 wound on a spool-shaped form 38 of non-ferromagnetic material. The solenoid 36 of Figs. 1 and 2 is maintained in fixed position over the lever 11. A plunger or core 39 of ferromagnetic material extends partially into and co-axially with the air core of the solenoid 36 and is mounted on the lever 11 for movement therewith. The plunger 39 whether moving or at rest is spaced from the inner cylindrical wall of the solenoid 36.

Electric current for energizing the solenoid 36 is supplied from a suitable and convenient source 40 by wiring 41 and is controlled by a potentiometer 42 having a conventional movable contact 43. When the movable contact 43 is in the solid line position of Fig. 2, current flows through the solenoid 36 and the latter is energized to form an electromagnetic field which tends to draw the plunger 39 into the solenoid air core. The force of this electromagnetic action is predetermined and so selected as to be somewhat less than the selected maximum indenting load of the lever 11. Thus, the accurate positioning of the indenter 12 is not disturbed by the energized solenoid 36, the lever 11 remains at rest on the contact 22, and yet the initial indenting load is substantially less than the final and maximum indenting load, which is secured by deenergizing the solenoid 36.

The motor 26 in elevating the screw 14 is supplied with current from the source 40 by wiring 46, 47 and 48. The circuit is completed between wiring 47 and 48 by engagement of the lever 11 and the contact 22, as illustrated in Figs. 1 and 2. The lever 11, as well as the contact 22, are insulated so that they may properly complete the motor circuit when the lever 11 is at rest and interrupt such circuit when the lever 11 and the contact 22 are disengaged. A manually operable switch 49 is also provided in the wiring 47.

The indenting machine is provided with a slow speed motor 51 which is supplied with current from the source 40 by a circuit including the manually operated switch 52. The motor 51 drives a cam 53 which operates two levers 54 and 56. The lever 56 is pivotally connected to the standard 23 and has a pin 57 for engaging and elevating the lever 11 when the lever 56 is raised by the cam 53. The lever 54 is pivotally connected to the machine base 10 and, when raised by the cam 53, closes a switch 58 of conventional form for starting the motor 26 in reverse to lower the screw 14.

Operation

The machine, when set as illustrated in Figs. 1 and 2 with a test piece or specimen 24 on the work support 13, is ready for a hardness testing operation. The solenoid 36 is energized by moving the potentiometer contact 43 to the solid line (high potential) position of Fig. 2. The lever 11 remains on the contact or rest 22 although the solenoid 36 is energized. Thus the desired and predetermined accurate positioning of the indenter 12 for initial contact with the work piece or specimen 24 is unaltered. The switch 49 is manually operated to the closed circuit position for starting the motor 26. The motor 26 drives the screw 14 to elevate the work support 13 until the specimen 24 contacts the indenter 12 and allows the indenter 12 to sink into the specimen 24 to such extent that a sufficiently deep indentation has been made to support the initial indenting load. The indenter 12, the lever 11, the plunger or core 39, and the weight hanger 17 then rise with the elevating screw 14, the work support 13 and the specimen 24. When the lever 11 is raised, its electrical contact with the rest 22 is broken and the circuit supplying current to the motor 26 is opened. The operator then releases (opens) the switch 49.

The specimen 24, by reason of its engagement with the indenter 12, now supports the lever 11. The solenoid 36 has continued to remain energized. The indentation in the specimen 24 at this stage of the machine operation has been made under a load which is substantially less than the final or maximum indenting load because of upward pull or lifting force of the solenoid 36 on the core or plunger 39 secured to the lever 11. In other words, the ferromagnetic core 39 tends to be drawn into the stronger part of the magnetic field at the center of the solenoid 36 with a force less than and opposing the desired maximum indenting load. The initial indentation, although subject to errors due to inertia of the load or weighted lever 11, is nevertheless smaller in size than the final indentation.

The final indentation is accomplished by gradually deenergizing the solenoid 36, the potentiometer contact 43 being slowly shifted to the dotted line (zero potential) position of Fig. 2 for this purpose. As the contact 43 is shifted, the load on the indenter 12 is correspondingly increased until a maximum predetermined load is obtained. The use of a potentiometer permits the electromagnetic force of the solenoid 36 to be gradually reduced and the indenting load to be gradually increased. Thus highly accurate indentations can be obtained even with maximum indenting loads which are relatively small and of an order of twenty-five grams. The machine therefore can perform hardness tests without errors due to inertia of the weighted lever 11.

The use of the solenoid 36 also avoids errors which would otherwise occur due to vibrations set up by the operation of the apparatus during the period in which the solenoid is energized and is being deenergized. It is to be noted that operation of the moving parts of the machine has been discontinued by the time the solenoid 36 is fully deenergized.

The specimen 24 is subjected to the predetermined maximum indenting force for a period of time depending on the material under test. Usually, a period of a few seconds is sufficient.

Errors are also avoided by the machine in separating the indenter 12 and the specimen 24. First the solenoid 36 is energized by moving the contact 43 of the potentiometer to the high potential position (solid line position, Fig. 2). Next the switch 52 is closed to start the slow speed motor 51. The motor 51 first lifts the lever 11 and the indenter 12 from the specimen by means of the cam 53, the lever or lifting fork 56 and the pin 57. Continued revolution of the cam 53 causes the latter to lift the lever 54 and thereby close the three pole switch 58. Closing of the switch 58 starts the motor 26 in reverse and completes a second circuit for the motor 51. The switch 52 may then be released (opened) by the operator. As the motor 51 operates, the specimen 24 will be lowered out of reach of the indenter 12, the lever 11 returned to rest on the contact 22, and the motors 26 and 51 stopped. The motors 26 and 51 are deenergized when the cam 53 has rotated sufficiently to permit the lever 54 to release the switch 58 and open the motor circuits. The specimen 24 may then be removed and its indentation measured in a microscope.

The reason for employing the solenoid 36 during the process of removing the indenter 12 is as follows: Measurements to determine the area of an indentation are made by setting the cross-hairs of a measuring microscope on the boundaries of the indentation. Any rocking or lateral motion of the indenter 12 as it is lifted from the specimen 24 further deforms the edges of the indentation and subsequent measurement of the indentation will give too large a value for the area. Now while the indenter 12 is resting in the indentation under the desired indenting load, the deformation of the material under the indenter 12 may be thought of as being composed of two kinds. Part of the deformation is permanent deformation due to plastic flow of the material and part is elastic deformation of the material. Because of the elastic deformation the material partially recovers its former shape when the loaded indenter 12 is removed. If, before the beam or lever 11 and the indenter 12 are lifted, the indenting load is reduced through the action of the solenoid 36, partial elastic recovery will take place, the greater part of which will occur under the tip of the indenter 12 and the lesser at the edges of the indenation due to the higher stresses in the material under the tip of the indenter 12. As a result of this elastic recovery the tip of the indenter 12 will remain in intimate contact with the material of the specimen 24, but at the boundary between the indentation and the surface of the specimen 24 there will be a small clearance between the sides of the indentation and the indenter faces. If, now, the beam or lever 11 and the indenter 12 are removed from the specimen 24 by the lifting fork 56, any rocking or lateral motion produced by the mechanical action will further deform only the deeper parts but will not alter the edges of the indentation and measurements made on the edges of the indentation will give correct values from which the recovered indentation area may be computed. It was found that using the solenoid coil in this manner resulted in more uniform indentation lengths for a given load and specimen.

*Figures 3, 4 and 5*

Other arrangements for the weighted lever 11, the solenoid 36 and the plunger 39 are illustrated in Figs. 3, 4 and 5. In each of these Figs. 3, 4 and 5, the solenoid 36 is stationary, and the plunger or core 39 is secured to the lever 11. In each of the arrangements of Figs. 1 through 5, the solenoid 36, when energized, tends to move the plunger 39 in a direction to lift the indenting end of the lever 11. With the solenoid 36 arranged as in either Fig. 1 or 3, its tendency is to pull the plunger 39 toward the center of solenoid 36.

With the solenoid 36 arranged as illustrated in either Fig. 4 or 5, it tends to push the lever 11 in a direction to lift its indenting end. In order that the solenoid 36 may apply its force to the plunger 39 in the proper direction to push the lever 11, the plunger 39 in Figs. 4 and 5 is formed in two sections, 61 and 62. The section 61 nearest the beam or lever 11 is formed of non-ferromagnetic metal and the other one 62 of the usual ferromagnetic metal.

From the foregoing, it will be obvious that the constructions of any one of the Figures 1 through 5 may be modified by reversing the solenoid 36 and the plunger or core 39, the solenoid 36 being then mounted on the weighted lever 11 and the core 39 being supported from the base 10.

It is also to be understood that the apparatus in making a hardness test operates in the same manner and as described whether the core 39 or the solenoid 36 is mounted on the lever 11 and whether one or another of the forms of this invention illustrated in Figures 1 through 5 is used.

The foregoing description and the accompanying drawings are to be understood as illustrative, since this invention includes all modifications and embodiments coming within the scope of the appended claims.

I claim:

1. In hardness testing apparatus having a weighted lever, an indenter carried by said lever, means pivotally supporting said lever, means providing a rest for said lever, power operated means for raising a work support to bring a test piece thereon into engagement with said indenter and thereafter to raise said indenter to lift said lever off of said rest, that improvement comprising a magnetic core carried by and movable with said lever, a solenoid carried by a stationary part of said apparatus and adapted when energized to exert a force on said core tending to move said core axially of said solenoid and in a direction to lift said lever off of said rest, and means for controlling the energization of said solenoid to reduce the effective indenting load on said indenter in its initial engagement with said test piece.

2. In hardness testing apparatus having a weighted lever carrying an indenter, a supporting rest for said lever, and a power operated device for raising a work support to effect engagement of a test piece thereon with said indenter and to indent said test piece by raising said indenter and thereby said weighted lever off of said rest, an improvement for eliminating indenting errors due to inertia of said weighted lever in the indenting operation, said improvement comprising a stationary support, a first means secured to said support, a second means secured to said lever for movement therewith and relative to said first means, one of said two means being adapted to provide a magnetic field, the other of said two means being positioned in said field and responsive thereto, said field providing a force tending to provide relative movement of said two means and thereby movement of said lever relative to said lever rest to reduce the effective indenting load on said indenter in its initial engagement with said test piece, and means for controlling said magnetic field.

3. In hardness testing apparatus having a weighted lever, an indenter carried by said lever, means pivotally supporting said lever, means providing a rest for said lever, power operated means for raising a work support to bring a test piece thereon into engagement with said indenter and thereafter to raise said indenter to lift said lever off of said rest, that improvement comprising a solenoid member having an air core, a plunger member of magnetic material extending axially within said air core, one of said members being mounted on said lever for movement therewith and relative to the other of said members, a stationary support to which said other member is secured, said solenoid member being adapted when energized to exert a force on said plunger member tending to provide relative axial movement of said members, said force being exerted in a direction to lift said lever off of said rest, and means for energizing said solenoid member to reduce the effective indenting load on said indenter in its initial engagement with said test piece.

4. In hardness testing apparatus having a weighted lever, an indenter carried by said lever, mean pivotally supporting said lever, means providing a rest for said lever, power- operated means for raising a work support to bring a test piece thereon into engagement with said indenter and thereafter to raise said indenter to lift said lever off of said rest, that improvement comprising a solenoid member having an air core, a plunger member of magnetic material extending axially within said air core, one of said members being mounted on said lever for movement therewith and relative to the other of said members, a stationary support to which said other member is secured, said solenoid member being adapted when energized to exert a force on said plunger member tending to provide relative axial movement of said members, said force being exerted in a direction to lift said lever off of said rest, and means for controlling the energization of said solenoid member to reduce the effective indenting load on said indenter in its initial engagement with said test piece, said controlling means being further adapted to deenergize said solenoid member and thereby free said indenter for engagement with the test piece in accordance with a predetermined maximum indenting load.

5. In hardness testing apparatus having a weighted lever, an indenter carried by said lever, means privotally supporting said lever, means providing a rest for said lever, power operated means for raising a work support to bring a test piece thereon into engagement with said indenter and thereafter to raise said indenter to lift said lever off of said rest, that improvement comprising a solenoid member having an air core, a plunger member of magnetic material extending axially within said air core, one of said members being mounted on said lever for movement therewith and relative to the other of said members, a stationary support to which said other member is secured, said solenoid member being adapted when energized to exert a force on said plunger member tending to provide relative axial movement of said members, said force being exerted in a direction to lift said lever off of said rest, means for energizing said solenoid member to reduce the effective indenting load on said indenter in its initial engagement with said test piece, and means for controlling the energization of said solenoid member to reduce the effective indenting load during the stage of separating the indenter from said test piece by operating said power means to lower said work support.

DOUGLAS R. TATE.